US005383541A

United States Patent [19]
Kaplan

[11] Patent Number: 5,383,541
[45] Date of Patent: Jan. 24, 1995

[54] AUTOMATIC GEAR SHIFT LOCK

[75] Inventor: James H. Kaplan, Mission Hills, Kans.

[73] Assignee: Harlan Corporation, Kansas City, Kans.

[21] Appl. No.: 2,947

[22] Filed: Jan. 11, 1993

[51] Int. Cl.⁶ ............................................. B60K 41/26
[52] U.S. Cl. ..................................... 192/4 C; 74/529
[58] Field of Search ................ 192/4 C, 3.63; 74/529, 74/483 R

[56] References Cited

U.S. PATENT DOCUMENTS

| | | | |
|---|---|---|---|
| 2,426,365 | 8/1947 | Matlock | 192/4 C X |
| 2,751,054 | 6/1956 | Del Re | 74/529 X |
| 2,936,864 | 5/1960 | Schjolin et al. | 192/4 C |
| 3,169,616 | 2/1965 | Hunsaker et al. | 192/4 C |
| 3,550,734 | 12/1970 | Sinoda | 192/4 C |
| 4,349,089 | 9/1982 | Finney | 192/4 C X |
| 4,572,340 | 2/1986 | Pierce | 192/4 C |

*Primary Examiner*—Rodney H. Bonck
*Attorney, Agent, or Firm*—Hovey, Williams, Timmons & Collins

[57] ABSTRACT

An apparatus 22 is provided for preventing shifting of a vehicle automatic transmission 10 between forward and reverse gears, except when the vehicle (e.g., an airport tractor) has stopped moving. The apparatus 22 preferably includes an assembly 24 operably coupled with the external shifting linkage 12 of transmission 10 for releasably locking the linkage 12 when the transmission 10 is in either a forward or reverse gear. Additionally, a sensing assembly 26 is provided for sensing braking system pressure, together with structure 28 interconnecting the sensing assembly 26 and locking assembly 24, in order to release the locking assembly 24 and permit transmission shifting via linkage 12. The apparatus 22 is advantageously completely mechanical, and includes an elongated rod 30 coupled with linkage 12 and engageable with a pivotal plate member 52, the latter being movable between a shift-locking position and a release position. A piston and cylinder assembly 66 is coupled to the plate member 50 and operates to move the plate member 50 to its release position, via a pressure sensitive valve 62 interposed within the vehicle braking system, when the pressure within the braking system is of sufficient magnitude to assure that the vehicle is essentially completely stopped.

7 Claims, 2 Drawing Sheets

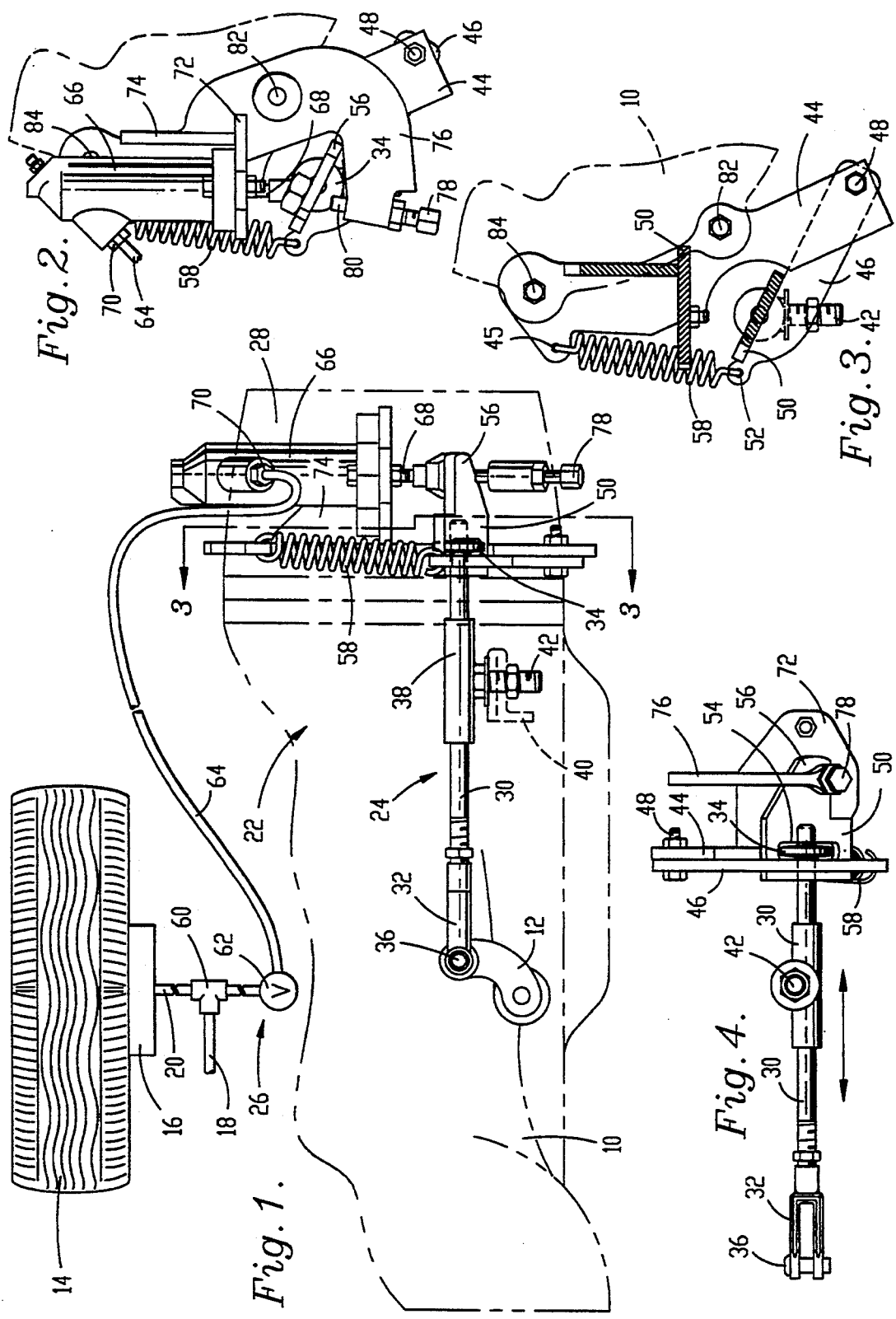

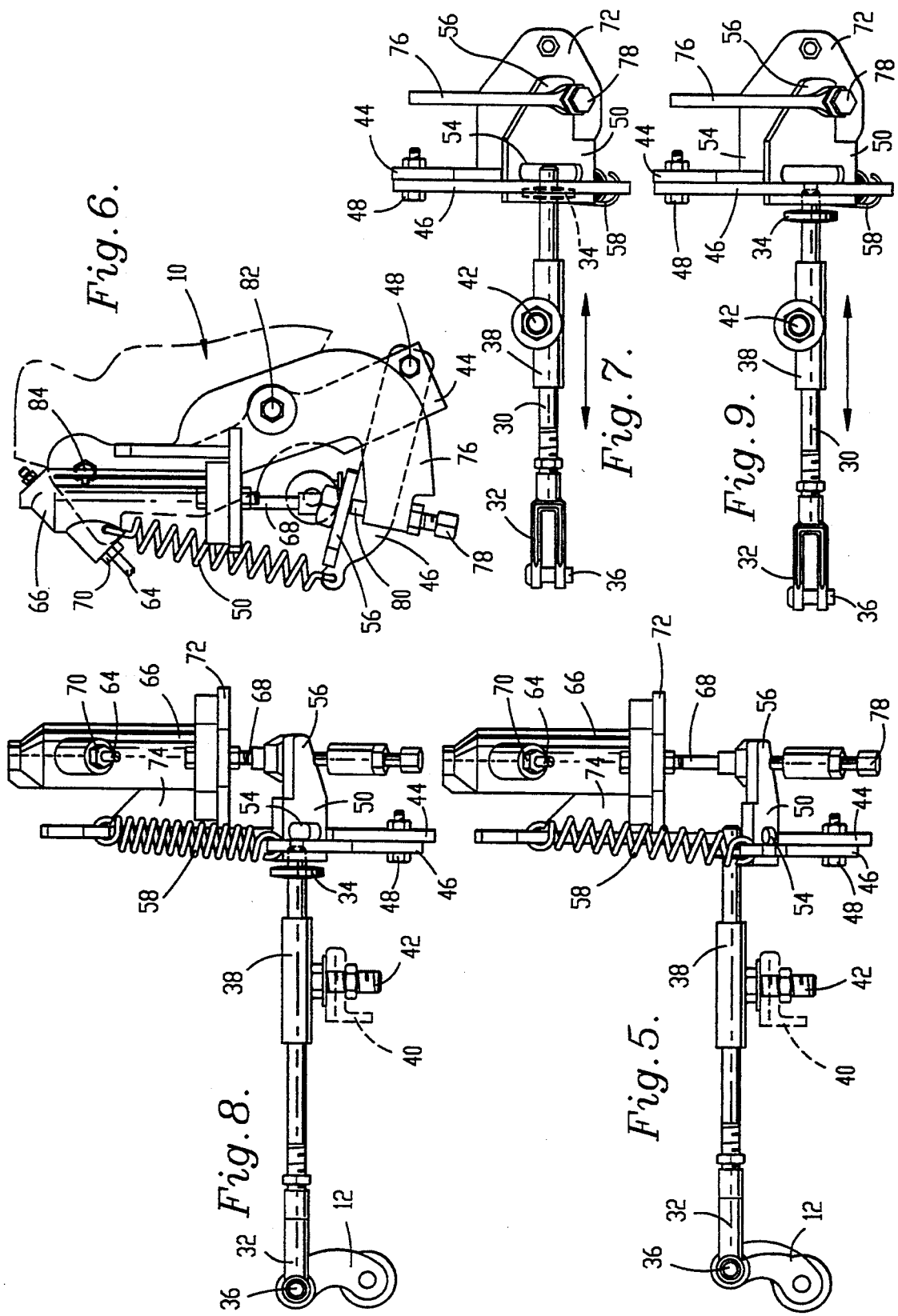

AUTOMATIC GEAR SHIFT LOCK

BACKGROUND OF THE INVENTION

1. Field of the Invention

The present invention is broadly concerned with apparatus adapted to be mounted upon a vehicle equipped with an automatic transmission for the purpose of preventing shifting of the transmission between forward and reverse gears during movement of the vehicle, thereby eliminating transmission or drive train damage attendant upon such shifting while the vehicle is in motion. More particularly, the apparatus of the invention is preferably designed to operate in conjunction with the hydraulic braking system of the vehicle, i.e., means is provided for sensing essentially complete cessation of movement of the vehicle resulting from application of the brakes, and such sensing is used to release a shift locking mechanism and permit shifting of the transmission between forward and reverse gears.

2. Description of the Prior Art

Small tractors used in and around airports or similar facilities for hauling luggage wagons or other loads are typically provided with an automatic transmission which the operator can selectively shift between forward and reverse gears. A common occurrence with such vehicles is damage to the automatic transmission or drive train thereof, when the operator shifts between forward and reverse gears while the vehicle is moving. Additionally, damage to the tractor or tow bar can occur because of jackknifing of the tractor relative to the towed vehicles under these circumstances.

Passenger vehicles have in the past been provided with electrical interlock systems preventing shifting of an automatic transmission from park to a forward or reverse gear unless the brake pedal is depressed. This is intended to prevent unintended jerking or surging of the vehicle when put into a driving gear. However, these devices do not operate in a manner to prevent shifting of the transmission between forward and reverse gears while the vehicle is in motion.

SUMMARY OF THE INVENTION

The present invention overcomes the problems outlined above, and provides an apparatus for preventing shifting of a vehicle automatic transmission between forward and reverse gears during movement of the vehicle, thereby virtually eliminating transmission or other vehicle damage attendant to attempted shifting during vehicle motion.

Broadly speaking, the apparatus of the invention includes means operably coupled with the shifting linkage of the transmission which releasably locks the linkage when the transmission is in either a forward or reverse gear. Moreover, means is provided for sensing essentially complete cessation of movement of the vehicle, together with means interconnecting the sensing means and locking means which is responsive to the sensing of movement cessation for releasing the locking means; this permits movement of the shifting linkage in order to allow shifting of the transmission between forward and reverse gears.

In preferred forms of the invention, the locking means includes an elongated rod operably coupled with the shifting linkage of the transmission and movable therewith between positions corresponding to a forward or reverse gear. A plate member is also provided which is shiftable between a locking position and a release position, and which slidably receives the rod. The plate member includes movement-blocking structure for, when the plate member is in its locking position, preventing movement of the rod when the transmission is either in a forward or reverse gear. The plate member is also configured to permit movement of the rod when the plate member is shifted to its release position.

Advantageously, the plate member is apertured, and the rod carries an enlarged, disk-like head oriented to fit with the plate aperture when the plate member is in its locking position; this serves to lock the transmission linkage, and thereby the position of the transmission, in a forward gear. Furthermore, the rod head is configured to abut the plate member when the rod is shifted to a position corresponding to reverse gear. In this fashion, the plate serves to prevent shifting movement of the rod when the transmission is in either a forward or reverse gear.

The sensing means forming a part of the overall apparatus of the invention preferably is in the form of a pressure sensitive valve operatively interposed within the hydraulic braking system of the vehicle for creating an output stream of hydraulic fluid when the braking system has been operated to an extent to essentially completely stop vehicle movement. This output is directed to a single-acting piston and cylinder assembly operably coupled to the plate member, in order to shift the latter to its release position. Hence, it will be appreciated that the plate is moved to its release position only when the vehicle has come to an essentially complete stop. After brake pressure is reduced to an extent which will permit movement of the vehicle, a spring operably coupled with the plate serves to reset and return the plate member to its locking position.

BRIEF DESCRIPTION OF THE DRAWINGS

FIG. 1 is a side elevational view illustrating a vehicle automatic transmission with the shift-preventing apparatus of the invention mounted adjacent the transmission, and further schematically depicting the interconnection of the piston and cylinder assembly forming a part of the apparatus with the hydraulic braking system of the vehicle;

FIG. 2 is a rear elevational view of the shift preventing apparatus;

FIG. 3 a vertical sectional view taken along line 3—3 of FIG. 1;

FIG. 4 is a partial bottom view of the apparatus illustrated In FIGS. 1 and 2, and depicting the rod member in a position corresponding to a forward gear, with the head of the rod member being located within the slot of the plate member;

FIG. 5 is a side elevational view of the apparatus, shown with the plate member thereof shifted downwardly to its release position;

FIG. 6 is a rear view with parts shown in phantom of the shift-preventing apparatus, illustrating the rod head positioned atop the plate member, corresponding to a neutral transmission position;

FIG. 7 is a bottom view of the apparatus illustrated in FIGS. 5 and 6;

FIG. 8 is a view similar to that of FIG. 5, but illustrating the rod head shifted leftwardly and in orientation to abut the plate member, with the latter being returned to its locking position; and FIG. 9 is a bottom view of the structure illustrated in FIG. 8.

DETAILED DESCRIPTION OF THE PREFERRED EMBODIMENTS

Turning now to the drawings, and particularly FIG. 1, an automatic vehicle transmission 10 is fragmentarily illustrated in phantom. The transmission 10 is itself entirely conventional, and includes an external shift linkage arm 12 coupled to a shift lever (not shown) within the cab of the vehicle. The transmission 10 can be selectively shifted between a reverse drive gear, neutral, and one or more forward drive gears by manipulation of the shift lever and consequent movement of the linkage arm 12. Also schematically illustrated in FIG. 1 is a portion of the vehicle hydraulic braking system, namely a front wheel 14 having conventional brake 16, as well as hydraulic lines 18 and 20 coupled to the usual dual-chamber master cylinder (not shown) forming a part of the braking system.

The shift-preventing apparatus 22 of the invention is also depicted in FIG. 1, and broadly includes means 24 operably coupled with the shifting linkage 12 for releasably locking the latter when the transmission is in either a forward or reverse gear, together with means 26 for sensing essentially complete cessation of movement of the associated vehicle. Finally, means broadly denoted by the numeral 28 is provided for interconnecting sensing means 26 with locking means 24; the interconnecting means 28 is responsive to sensing of vehicle movement cessation for releasing the locking means 24 and permitting movement of the shift linkage 12 in order to allow shifting of the transmission 10 between forward and reverse gears.

In more detail, the locking means 24 preferably includes an elongated, axially reciprocal rod 30 having a clevis 32 adjacent the forward end thereof together with a radially enlarged disk 34 affixed to the rearward end thereof. As best seen in FIG. 1, a pin 36 serves to connect clevis 32 with linkage arm 12. Smooth fore and aft reciprocation of rod 30 is facilitated by provision of guide sleeve 38 located intermediate the ends of the rod. The guide sleeve 38 is in turn secured to a bracket 40 affixed to the transmission housing, by means of threaded connector 42.

The overall locking means further includes an upright, rigidly mounted plate 44 oriented transverse to the longitudinal axis of rod 30 and having a connection eye 45 adjacent the upper end thereof. An arm 46 is pivotally coupled to stationary plate 44 at the lower ends thereof, through use of a pivot bolt 48. The arm 46 includes a plate member 50 adjacent the upper end thereof remote from pivot bolt 48, as well as a connection eye 52. Plate member 50 is provided with an elongated slot 54 therein which is oriented generally parallel with stationary plate 44 and just rearwardly thereof. The plate member 50 also includes a rearwardly extending connection segment 56 which is important for purposes to be described. An elongated coil spring 58 is operatively interconnected between eye 45 of stationary plate 45 and eye 52 of arm 46, thereby biasing the arm to its upper locking position illustrated in FIGS. 1-4.

Sensing means 26 is preferably operatively interconnected with the braking system of the vehicle in order to sense when this system is operated to an extent to essentially completely stop movement of the vehicle. Specifically, in preferred forms a tee 60 is interposed in the front brake line, such as between hydraulic lines 18 and 20 as illustrated, with a one-way, pressure responsive valve 62 operably coupled to one leg of the tee 60. An exemplary valve is a Waterman Model 12CR 12-3-FB pressure responsive valve. The valve 62 is designed to create an output when hydraulic pressure on the order of 800–1100 psi is present within the braking system. This assures that the valve output will occur only under circumstances where the vehicle has essentially completely stopped stopped movement. As illustrated in FIG. 1, the output from valve 62 is conveyed via hydraulic line 64.

The interconnecting means 28 is in the form of an upright, single-acting piston and cylinder assembly 66 having a depending, extensible piston rod 68 extending from the lower end thereof, as well as a hydraulic fluid inlet port 70 adjacent the upper end thereof. The piston and cylinder assembly 66 is fixedly secured to a laterally extending, apertured mounting plate 72, the latter being welded to stationary plate 44 and stabilized by means of triangular reinforcement plate 74. The lowermost end of piston rod 68 is affixed to connection segment 56 forming a part of plate member 50.

An arcuate, rigidly mounted lower plate 76 is welded to mounting plate 72 and reinforcement 74 and carries, adjacent the lowermost end thereof, an adjustable limit screw 78. The upper end 80 of the limit screw 78 is oriented to abut the underside of connection segment 56 when plate member 50 is moved downwardly upon operation of piston and cylinder assembly 66. This allows fine adjustment of the permissible length of travel of plate member 50.

Aligned apertures provided in the laterally spaced apart rigid plates 44 and 76 accommodate a transverse mounting screw 82 which extends through these apertures and is attached to the housing of transmission 10. An additional mounting screw 84 is also provided, which passes through an appropriate aperture adjacent the upper end of plate 44 and likewise interconnects with the transmission housing.

The operation of shift-preventing apparatus 22 will next be described. Consider first the situation wherein the vehicle is either moving, or the hydraulic brake system thereof is not operated to an extent which will preclude significant vehicle movement. In such a case, valve 62 remains closed, thereby preventing flow of hydraulic fluid via line 64 to piston and cylinder assembly 66. This means that plate member 50 is urged upwardly under the influence of spring 58 to its locking position. This is illustrated for example in FIGS. 1–4 and 8. As a consequence of this position, it is impossible to shift the transmission 10 between forward and reverse gears. Attention is specifically directed to FIGS. 1, 3 and 4, which illustrates the rod 30 shifted rightwardly to an extent that disk 34 is received within slot 54 of plate member 50; this corresponds to the transmission 10 being shifted to a forward gear. In such orientation, it will be appreciated that the interference between disk 34 and plate member 50 precludes significant axial shifting movement of rod 30, thereby preventing shifting of the transmission 10 to reverse gear.

Similarly, FIG. 8 illustrates the orientation of rod 30 when the transmission 10 is in reverse gear. In this case, the disk 34 is positioned astride plate member 50, with the disk being oriented to abut the side margin of the plate member 50 if an attempt is made to shift the transmission to a forward gear. Thus, in either a forward or reverse gear setting, it is impossible to shift the transmission 10 until plate member 50 has been pivoted to its release position.

When the vehicle braking system has been operated to an extent to essentially completely stop movement of the vehicle (which would typically correspond to a brake line pressure of from about 800-1100 psi), pressure responsive valve 62 opens and delivers an output stream of hydraulic fluid via line 64 to inlet port 70 of piston and cylinder assembly 66. This serves to extend piston rod 68 downwardly until connection segment 56 contacts the upper end 80 of limit screw 78. This situation is illustrated in FIGS. 5 and 6, and it will be observed that lowering of the plate member 52 permits axial shifting of rod 30 and disk 34, in order to allow shifting between forward and reverse gears. That is to say, when the transmission 10 is in reverse (FIG. 8), lowering of the plate member 50 allows rightward movement of the rod 30 and disk 34 across the upper surface of plate member 50 until the disk is oriented above aperture 54. Similarly, when the transmission is in a forward gear (FIG. 3), downward shifting of plate member 50 permits leftward shifting of the rod and disk until the latter assumes the FIG. 8 position corresponding to reverse gear of the transmission 10. As the disk 34 slides across the upper face of plate member 50 between the side marginal edge thereof and slot 54, the transmission passes through its neutral position.

It will thus be seen that the present invention provides a simple yet highly reliable apparatus 22 for positively precluding shifting of the transmission 10 between forward and reverse gears in situations where the vehicle is either moving or could undergo significant movement. The preferred apparatus 22 is completely mechanical and avoids the necessity for complex electrical devices characteristic of conventional interlock arrangements.

I claim:

1. An apparatus for use in locking the automatic transmission linkage of a vehicle against shifting between forward and reverse gears during movement of the vehicle, wherein the vehicle includes a hydraulic braking system, the apparatus comprising:
    a locking means for locking the linkage against shifting movement between the forward and reverse gears;
    a hydraulically-actuated shifting means for shifting the locking means between a locked position in which the linkage is locked against movement between the forward and reverse gears and an unlocked position in which the linkage is allowed to move between the forward and reverse gears; and
    a pressure sensitive valve means connected between the braking system and the shifting means and being movable from a closed position in which hydraulic fluid is shut off from the shifting means and an open position in which fluid is delivered to the shifting means, the valve means moving from the closed to the open position when the pressure in the braking system reaches a preset level indicative of complete cessation of movement of the vehicle so that fluid is delivered to the shifting means to shift the locking means to the unlocked position,
    said locking means includes an elongated rod adapted to be operably coupled with said linkage and movable therewith between positions corresponding to the forward or reverse gears; and
    a plate member shiftable between the locking and unlocking positions and slidably receiving said rod, said plate member including movement-blocking structure for, when the plate member is in said locking position, preventing movement of said rod when said transmission linkage is in either a forward or reverse gear, said plate member permitting movement of said rod when the plate member is in said unlocking position.

2. An apparatus as set forth in claim 1, wherein said plate member is apertured, said rod carrying an enlarged head oriented to fit within said aperture when said plate member is in the locking position thereof, in order to prevent movement of said rod when said transmission linkage is in one of said forward and reverse gears.

3. An apparatus as set forth in claim 2, wherein said head engages said plate member when the plate is in the locking position thereof, in order to prevent movement of said rod when said transmission linkage is in the other of said forward and reverse gears.

4. Apparatus as set forth in claim 1, wherein said shifting means includes a hydraulic piston and cylinder assembly having a cylinder and a shiftable piston rod extending therefrom, said piston rod being coupled with said plate member for shifting thereof to said unlocking position when said braking system reaches the preset level.

5. An apparatus as set forth in claim 4, further including spring means operable for return shifting of said plate member to said locking position thereof, when the pressure in said braking system drops below the preset level.

6. An apparatus as set forth in claim 2, wherein said shifting means includes a hydraulic piston and cylinder assembly including a cylinder and a shiftable piston rod extending therefrom, said piston rod being coupled with said locking means for releasing the locking means upon shifting of the piston rod in a first direction, in response to said valve means.

7. An apparatus as set forth in claim 6, further including means operable for resetting said locking means when said valve means returns to the closed position.

* * * * *